United States Patent [19]

Rasmussen et al.

[11] 4,207,353

[45] Jun. 10, 1980

[54] FOOD CASING AND METHOD OF PREPARING SAME

[75] Inventors: Jerome J. M. Rasmussen, Burbank, Ill.; Richard C. Waldman, Glen Rock, Pa.; Richard L. Oliver, Schaumburg, Ill.

[73] Assignee: Union Carbide Corporation, New York, N.Y.

[21] Appl. No.: 13,536

[22] Filed: Feb. 21, 1979

Related U.S. Application Data

[62] Division of Ser. No. 848,065, Nov. 3, 1977, Pat. No. 4,161,968.

[51] Int. Cl.² .................. A22C 13/00; F16L 11/02; A22C 11/00
[52] U.S. Cl. .................. 426/513; 426/410; 426/413; 426/135; 426/414; 426/415; 426/389; 426/811; 427/230; 427/236; 427/394; 428/36; 428/478; 428/479; 428/536; 428/527; 138/118.1; 138/145; 17/49; 427/389.9
[58] Field of Search .............. 428/35, 36, 536, 478.4, 428/413, 527, 479.3; 138/118.1, 145; 17/49; 426/413, 135, 410, 513, 414, 811, 415, 389; 427/230, 236, 390 R, 394

[56] References Cited

U.S. PATENT DOCUMENTS

| 2,796,362 | 6/1957 | Wooding | 428/384 |
|---|---|---|---|
| 2,926,154 | 2/1960 | Kein | 260/785 C |
| 3,367,786 | 2/1968 | Rose | 426/413 |
| 3,378,379 | 4/1968 | Shiner | 138/118.1 |
| 3,427,169 | 2/1969 | Rose | 426/135 |
| 3,451,827 | 6/1969 | Bridgeford | 426/420 |
| 3,539,361 | 11/1970 | Coleman | 138/118.1 |
| 3,743,521 | 7/1973 | Rasmussen | 426/135 |
| 3,818,347 | 6/1974 | Rose | 138/118.1 |
| 3,898,348 | 8/1975 | Chiu | 426/413 |
| 3,935,320 | 1/1976 | Chiu | 426/135 |
| 4,137,947 | 2/1979 | Bridgeford | 426/415 |

*Primary Examiner*—Ellis P. Robinson
*Attorney, Agent, or Firm*—David Fink

[57] ABSTRACT

A cellulosic food casing includes an internal coating comprising a water soluble cellulose ether and a cationic thermosetting resin.

31 Claims, No Drawings

FOOD CASING AND METHOD OF PREPARING SAME

This application is a divisional application of Ser. No. 848,065, filed Nov. 3, 1977, now U.S. Pat. No. 4,161,968.

The present invention relates to a food casing and particularly to a cellulosic food casing suitable for use for encasing and processing a food product and thereafter being removed from the food product, and to a method of manufacturing such a casing.

More particularly, the invention relates to a cellulosic food casing suitable for use with a small diameter dry sausage product generally identified in the industry as "snack foods". These snack foods are presently processed in edible collagen casings.

Generally, food casings used in the processed food industry are thin-walled tubings of different diameters prepared from regenerated cellulose, cellulose derivatives, alginates, collagen and the like. Some types of food casings include a fibrous web embedded in the wall of the casing and such casings are commonly termed in the art as "fibrous casings".

The applicants have discovered that the snack food type products can be processed in cellulosic food casings instead of collagen casings and thereby result in a reduced cost while enabling increased productivity through the use of high speed automatic equipment.

The use of cellulosic food casings for processing snack foods presents several problems not encountered in connection with edible collagen casings. Generally, an edible collagen casing is not removed from a snack food prior to human consumption whereas a cellulosic food casing must be removed.

The removal or peeling of the cellulosic casing is preferably carried out with a high speed automatic peeling machine in order to minimize the costs.

When the cellulosic casing is removed from the meat mass or sausage, there is an occasional tendency for some of the meat to adhere to the casing and thereby be torn from the sausage along with the casing. This results in the surface marring of the sausage and reduced consumer appeal.

Typical peeling machines are described in the U.S. Pat. Nos. 2,424,346 to Wilcoxon, 2,514,660 to McClure et. al., 2,686,972 to Greg, and 2,757,409 to Parkers et al. Peeling machines require a low resistance to the separation of a food casing from the meat mass to avoid the product moving through the machine unpeeled or causing a jam. An unpeeled product must be processed by hand and therefore increases the cost of operation.

The U.S. Pat. Nos. 3,898,348 to Chiu et. al., 2,901,358 to Underwood et. al., 3,106,471 and 3,158,492 to Firth, 3,307,956 to Chiu et. al., 3,442,663 to Turbak, and 3,558,331 to Tarika are concerned with solutions to the problem of providing an easy release characteristic to food casing.

Another problem realized in connection with the use of conventional cellulosic casings for snack foods is the tendency for the casing to separate from the encased meat mass during processing so that grease can accumulate between the meat mass and the casing. The appearance of surface grease can reduce consumer appeal.

The U.S. Pat. Nos. 3,378,379 to Shiner et. al. and 3,743,521 to Rasmussen are concerned with solutions to the problem of fat-out or surface grease for cellulosic casings.

Generally, it would appear that the problems of achieving a good release and avoiding surface grease for cellulosic casings in connection with snack foods cannot be resolved because the respective remedies have conflicting effects. A good release agent would be expected to cause a weak adhesion between the casing and the meat mass so that excessive surface grease would have a tendency to result. A remedy for surface grease would be expected to cause a strong adhesion between the casing and the meat mass so that poor peeling would result.

Applicants have conducted experiments which confirmed these expectations.

In accordance with the present invention, a cellulosic food casing is provided which will adhere to a food mass encased and processed therein and which can thereafter be easily removed from the surface of the processed food mass.

It is an object of the invention to provide a cellulosic food casing suitable for use in connection with a snack food.

It is also an object of the invention to provide the cellulosic food casing in a shirred form.

Further objects and advantages of the invention will be set forth, in part, in the following specification and, in part, will be obvious therefrom without being specifically referred to, the same being realized and pointed out in the claims hereof.

One embodiment of the invention is a cellulosic food casing including an internal coating comprising a water soluble cellulose ether and a cationic thermosetting resin.

Generally, the food casing is tubular and cellulosic food casings include, but are not limited to, regenerated cellulose casing with or without a fibrous web fabricated in accordance with known methods.

Typically, the water soluble cellulose ethers suitable for the invention include non-ionic water soluble alkyl and hydroxyalkyl cellulose ethers such as methyl cellulose, hydroxypropyl methyl cellulose, hydroxypropyl cellulose, ethyl methyl cellulose, hydroxyethyl cellulose, and ethylhydroxyethyl cellulose, and the anionic water soluble cellulose ethers such as carboxymethyl cellulose, and carboxymethyl hydroxyethyl cellulose. Methyl cellulose is particularly preferred.

Commercially, carboxymethyl cellulose and carboxymethyl hydroxyethyl cellulose are usually sold as the sodium salt and it is an established trade practice not to refer to the commercial product as the sodium salt. For purposes of this application references to these materials shall include the sodium salts and other alkali metal salts thereof.

Other suitable cellulose ethers include alkali soluble cellulose ethers such as alkali soluble methyl cellulose and hydroxyethyl cellulose. For purposes of this application, the definition of water soluble is intended to include alkali soluble cellulose ethers.

The cationic thermosetting resins suitable for the invention are preferably water soluble or water dispersible resins which can be cured to the insoluble state. The resins include the reaction products of an epichlorohydrin and a polyamide, a modified melamine and formaldehyde, and a modified urea and formaldehyde. In addition, polyalkylenepolyamines and/or their salts, which include polyamines such as diethylenetriamine, triethylenetetramine, tetraethylenepentamine and the corresponding polypropylenepolyamines, as well as 4,4'-iminobisbutylamine, and 3,3'3''-nitrilotrispropylamine, are suitable. In general, an aldehyde-reactive polyalkylene-polyamine may be used provided the ratio of carbon atoms to nitrogen atoms therein is not greater than about 4:1.

The higher polyalkylene-polyamines can also be used including polyethylenimine (formed by homopolymerization of ethyleneimine), and the long chain polyalkylene-polyamines formed by reacting a simple alkylenediamine or a simple polyalkylene-polyamine with from about 0.6 to about 1.5 mols of an alkylene dichloride, an alkylene dichlorohydrin or epichlorohydrin.

A method for preparing the epichlorohydrin-polyamine compositions is described in U.S. Pat. No. 2,926,154. A method of preparing the cationic melamine-formaldehyde thermosetting resin compositions is described in U.S. Pat. No. 2,796,362. A method of preparing urea-formaldehyde thermosetting resin is described in U.S. Pat. No. 2,616,874.

Coating compositions suitable for use in accordance with the present invention are homogeneous aqueous solutions or suspensions typically containing at least about 0.286% by weight of a water soluble cellulose ether and at least about 0.029% by weight of a cationic thermosetting resin when the coating composition is applied by internal spraying during shirring. The concentrations could be lower for slugging. The preferred ratio of the water soluble cellulose ether to the cationic thermosetting resin in the coating composition depends on the specific chemicals and can be determined by straight forward experimentation. For methyl cellulose and Kymene (also called resin 4190), a product sold by Hercules, Inc.; the preferred weight ratio is about 10:1.

Suitable coating compositions may also contain other ingredients such as mineral oils, polyols such as propylene glycol, glycerol, triethylene glycol and sorbitol and water soluble alkylene oxide adducts of partial fatty acid esters as, for example, ethoxylated fatty acid partial esters of such polyols as anhydrosorbitols, glycerol, polyglycerol, pentaerythritol and glucosides. Typical water soluble adducts of this class are materials commercially available under the trademark "Tween" (Atlas Chemical Industries, inc.). These ingredients serve as processing aids.

A number of factors are known to affect the preparation of shirred casing sticks and the suitability of the shirred casing sticks for use in the processing of various types of food products, particularly when high speed automatic equipment is employed in the shirring and stuffing operations. It is well known in the art, for example, that if the moisture content of the tubular casing is too great, difficulty is experienced in formation of proper pleats and shirring patterns, and "bowing and snaking" of the resulting shirred casing stick will occur, thereby making stuffing operations more difficult. Further, it has been found that when water is applied to the casing during the shirring process, application of excessive amounts of water can cause the casing to seize on the shirring mandrel thereby making further processing very difficult, if not impossible.

Accordingly, when it is desired to apply the coating compositions described herein, as, for example, while the tubular casing is passing over a shirring mandrel during the shirring operation, it has been found that the amount of coating composition applied must be controlled to add the desired amount of water to the casing. It is also advantageous to avoid application of more coating composition than can be retained by the casing in order to prevent excess coating composition from being lost and wasted or from accumulating in localized areas of the shirred sticks with resulting detrimental effects thereto. Generally, the level of application of the coating compositions of this invention to the casing is about 3.5 milligrams per square inch of internal casing surface.

The amount of water and other ingredients applied to the surface of the casing may be controlled by varying the amount of coating composition applied and/or the concentration of the ingredients in the coating composition.

Application of the coating composition to the internal casing surface can be accomplished by using any one of a number of well-known methods. Thus, for example, the coating composition can be introduced into the casing in the form of a slug of liquid and advancing the casing past the liquid slug coats the inner surface thereof. A typical slugging operation is shown and described in the U.S. Pat. No. 3,378,379. Alternatively, the aqueous coating composition can be applied onto the casing internal surface through a hollow mandrel over which the casing is advancing as, for example, the mandrel of a casing shirring machine in a manner similar to that described in the U.S. Pat. No. 3,451,827. This method is generally referred to as "internal spray shirring".

The casing prepared in accordance with the preferred embodiment of this invention includes at least about 0.010 milligrams of methyl cellulose and at least about 0.001 milligrams of Kymene, a polyamide epichlorohydrin resin, per square inch of internal casing surface.

Casing produced in accordance with the invention can be used not only in the preparation of snack food products, but also in the preparation of food products from a wide range of formulations and processing conditions because the casings can be readily removed from the processed food product using high speed automatic peeling machines with high peeling efficiency. The food products processed within the instant casing do not exhibit an undesirable level of surface grease.

As used herein, surface grease rating is a subjective measure of the amount of accumulated fat and/or grease on the meat mass surface after peeling wherein "1" represents a substantially grease free surface, "5" represents an acceptable (but slightly greasy) surface, and "10" represents heavy fat deposits.

As used herein, peelability is defined by dividing the number of sausage links successfully peeled by a high speed automatic peeler by the total number of sausage links fed into the peeler. A peelability of at least about 95% is considered to be a commercially acceptable level.

Illustrative, non-limiting examples of the practice of the invention are set out below. Numerous other examples can readily be evolved in the light of the guiding principles and teachings contained herein. The examples herein are intended merely to illustrate the invention and not in any sense to limit the manner in which the invention can be practiced. The parts and percentages recited therein and throughout this specification, unless otherwise stated, refer to parts by weight and percentages by weight.

EXAMPLE I

Cellulosic casing samples including the respective coating compositions having the proportions of ingredients shown in Table 1 were prepared. The internal surface of the treated casing contained a uniform coating of an admixture of methyl cellulose and Kymene.

The casing samples used in this example were prepared from commercially produced cellulosic casing samples 55 feet long and having a flatwidth of about 0.75 inches. The casings were shirred on an apparatus such as that disclosed in U.S. Pat. No. 3,110,058 to Marbach. As each 55 foot length of casing was being shirred, the particular coating composition was applied in the amount of about 3.5 milligrams of coating composition per square inch of internal casing surface by metering through the shirring mandrel along with the stream of inflation air.

EXAMPLE II

This example shows the effect of the ratio of methyl cellulose to Kymene in the treating solution on the peelability and surface grease rating of the treated casings. The casing samples no. 1 to 16 as prepared in Example I were stuffed with a snack food emulsion prepared from an all beef formulation and linked into sausage products by conventional linking apparatus.

A typical snack food emulsion has a comparatively high fat content and includes a starter culture such as Lactacel. The snack food emulsion used was selected to be similar to typical snack food emulsions.

A typical smokehouse or product processing schedule was carried out. The sausage products were subjected to a twelve minute smoke period. For the first hour, the dry bulb setting was about 110° F. and the wet bulb temperature was at ambient. After about one hour, the wet bulb temperature was adjusted to be about 104° F. and the relative humidity was about 81%. These conditions were maintained for about 6 to 7 hours in order to develop the starter culture. Thereafter, the dry bulb temperature was adjusted to about 140° F. and the wet bulb temperture was adjusted to about 112° F. The relative humidity was from about 40% to about 41% and these conditions were maintained for an additional 40 hours. After a total processing time of about 48 hours, the sausage products were subjected to a cold shower for about 10 minutes and then stored in a cooler at a temperature of about 40° F. prior to peeling.

The processed encased food products were sprayed with water to moisten the casings and then the casings were removed by passing through a commercially available high speed automatic peeler. A Ranger Apollo high-speed peeling machine was used.

The peeled snack food products were evaluated for the presence of surface grease. The results are shown in Table 2. The peelability of the casings from the encased food products was determined by dividing the number of sausage links successfully peeled on the Ranger Apollo Peeler by the total number of sausage links tested.

Table 1

| Casing Sample No. | COATING COMPOSITIONS | | | | | |
|---|---|---|---|---|---|---|
| | Kymene Solutions (12.5% Solids) (g) | Methyl Cellulose (100% Solids) (g) | Tween 80 (g) | H$_2$O (g) | Propylene Glycol (g) | Mineral Oil (g) |
| 1 | 22.8 | 11.4 | 12.1 | 426.9 | 465.4 | 48.6 |
| 2 | 22.8 | 12.8 | 12.1 | 436.9 | 465.4 | 48.6 |
| 3 | 22.8 | 14.25 | 12.1 | 436.9 | 465.4 | 48.6 |
| 4 | 22.8 | 17.1 | 12.1 | 434.1 | 465.4 | 48.6 |
| 5 | 22.8 | 19.95 | 12.1 | 431.2 | 465.4 | 48.6 |
| 6 | 22.8 | 22.8 | 12.1 | 428.4 | 465.4 | 48.6 |
| 7 | 22.8 | 28.5 | 12.1 | 422.7 | 465.4 | 48.6 |
| 8 | 22.8 | 57 | 12.1 | 394.1 | 465.4 | 48.6 |
| 9 | 11.4 | 28.5 | 12.1 | 434.0 | 465.4 | 48.6 |
| 10 | 38.9 | 28.5 | 12.1 | 406.15 | 465.4 | 48.6 |
| 11 | 228.0 | 28.5 | 12.1 | 217.4 | 465.4 | 48.6 |
| 12 | 44.0 | 8.25 | 12.1 | 431.5 | 465.4 | 48.6 |
| 13 | 33.0 | 8.25 | 12.1 | 431.5 | 465.4 | 48.6 |
| 14 | 26.4 | 8.25 | 12.1 | 431.5 | 465.4 | 48.6 |
| 15 | 22.0 | 8.25 | 12.1 | 431.5 | 465.4 | 48.6 |
| 16 | 18.86 | 8.25 | 12.1 | 431.5 | 465.4 | 48.6 |
| 17 | 20.0 | 25.0 | 12.1 | 428.9 | 465.4 | 48.6 |
| 18 | 16.0 | 20.0 | 12.1 | 437.9 | 465.4 | 48.6 |
| 19 | 12.0 | 15.0 | 12.1 | 446.9 | 465.4 | 48.6 |
| 20 | 8.0 | 10.0 | 12.1 | 455.9 | 465.4 | 48.6 |
| 21 | 4.0 | 5.0 | 12.1 | 464.9 | 465.4 | 48.6 |

TABLE 2

| Casing Sample No. | Methyl Cellulose Treatment Level mg/100in$^2$) | Kymene Treatment Level (mg/100in$^2$) | MC: Kymene Treatment Ratio | Surface Grease Rating | Peelability % |
|---|---|---|---|---|---|
| 1 | 4.0 | 1.0 | 4/1 | 3 | 86.5 |
| 2 | 4.5 | 1.0 | 4.5/1 | 3 | 86.0 |
| 3 | 5.0 | 1.0 | 5/1 | 2 | 94.9 |
| 4 | 6.0 | 1.0 | 6/1 | 2 | 95.8 |
| 5 | 7.0 | 1.0 | 7/1 | 3 | 93.9 |
| 6 | 8.0 | 1.0 | 8/1 | 3 | 97.6 |
| 7 | 10.0 | 1.0 | 10/1 | 3 | 96.3 |
| 8 | 20.0 | 1.0 | 20/1 | 3 | 98.1 |
| 9 | 10.0 | 0.5 | 20/1 | 2 | 97.0 |
| 10 | 10.0 | 1.7 | 6/1 | 1 | 86.0 |
| 11 | 10.0 | 10.0 | 1/1 | 1 | 0 |
| 12 | 2.9 | 1.9 | 1.5/1 | 3 | 40.3 |
| 13 | 2.9 | 1.4 | 2.0/1 | 3 | 57.6 |
| 14 | 2.9 | 1.2 | 2.5/1 | 4 | 72.8 |
| 15 | 2.9 | 1.0 | 3.0/1 | 2 | 73.6 |

TABLE 2-continued

| Casing Sample No. | Methyl Cellulose Treatment Level mg/100in$^2$ | Kymene Treatment Level (mg/100in$^2$) | MC: Kymene Treatment Ratio | Surface Grease Rating | Peelability % |
|---|---|---|---|---|---|
| 16 | 2.9 | 0.8 | 3.5/1 | 2 | 85.6 |
| Untreated Sample # 1 | — | — | — | 6 | 89.0 |
| Untreated Sample # 2 | — | — | — | 8 | 100.00 |
| Untreated Sample # 3 | — | — | — | 7 | 86.0 |

MC: Methyl Cellulose

All the snack food products processed in the treated casing samples of this example exhibited acceptable levels of surface grease.

The casing samples no. 3 to 9 exhibited acceptable peelability, but the casing samples no. 1, 2, and 10 to 16 exhibited commercially unacceptable degree of peelability.

Table 2 shows that as the treatment ratio increases, the degree of peelability increases. This shows how the preferred ratio of cellulose ether to resin can be determined. The Untreated Samples 1 to 3 show the uncontrolled variation in performance. The Untreated Sample 2 shows that the product is prone to rendering or fat-out as indicated by the high grease rating. The peelability of untreated sample 2 was high, as expected, because of the ease of casing release associated with the presence of the product surface grease.

EXAMPLE III

This example shows the effect of total treatment levels upon product performance. The casing samples no. 7, and 17 to 21 as prepared in Example 1 were used in this example. Additional samples 36 and 37 were prepared in the same manner to provide lower treatment levels. These casing samples contained various levels of coating composition wherein the ratio of methyl cellulose to Kymene was kept substantially constant. The casing samples were stuffed, processed and peeled in accordance with the procedure described in the Example II. The degree of peelability of the casings, as well as the surface grease rating were evaluated. The results are shown in Table 3.

TABLE 3

| Casing Sample No. | Methyl Cellulose Treatment Level (mg/100in$^2$) | Kymene Treatment Level (mg/100in$^2$) | MC: Kymene Treatment Ratio | Total Treatment Level (mg/100in$^2$) | Surface Grease Rating | % Peelability |
|---|---|---|---|---|---|---|
| 7 | 10.00 | 1.00 | 10:1 | 11.00 | 3 | 96.3 |
| 17 | 8.75 | 0.88 | 10:1 | 9.63 | 2 | 97.4 |
| 18 | 7.00 | 0.70 | 10:1 | 7.70 | 2 | 98.7 |
| 19 | 5.25 | 0.53 | 10:1 | 5.78 | 2 | 98.7 |
| 20 | 3.50 | 0.35 | 10:1 | 3.85 | 2 | 99.0 |
| 21 | 1.75 | 0.18 | 10:1 | 1.93 | 1 | 98.0 |
| 36 | 1.38 | 0.14 | 10:1 | 1.52 | 2 | 98.0 |
| 37 | 1.0 | 0.1 | 10:1 | 1.10 | 1 | 96.0 |

MC- Methyl Cellulose

All the casings used in this example exhibited good peelability and good fat-out resistance (acceptable surface grease rating). This indicates that at a treatment ratio of about 10:1 of methyl cellulose to Kymene, the treatment is effective over a wide range of treatment levels. Table 3 shows that when the treatment ratio is about 10:1 a very low level of methyl cellulose and Kymene is effective.

EXAMPLE IV

In this example, several different cellulose ethers and water soluble cationic thermosetting resins were evaluated. Coating compositions No. 22 to 27, having the proportions of ingredients shown in Table 4, were prepared. The casing samples No. 22 to 27 were treated respectively with coating compositions No. 22 to 27. The coating compositions wer applied by internal spray shirring. The shirred casings were stuffed with a standard snack food emulsion and processed under typical smokehouse processing conditions as described in the Example II.

The processed food products were sprayed with water to moisten the casings and then the casings were removed by passing through a Ranger Apollo Peeler machine. Peelability of the casings and surface grease ratings of the product are shown in Table 4a. The treatment levels and the ratios of the respective cellulose ethers to cationic thermosetting resins are also shown in Table 4a.

TABLE 4

| Casing Sample No. | Resin (g) | Cellulose Ether (g) | Tween 80 (g) | H$_2$O(g) | Propylene Glycol (g) | Mineral Oil (g) |
|---|---|---|---|---|---|---|
| 22 | 22.8 g.Kymene (12.5% Solids) | 28.5 g.Methyl Cellulose (100% Solids) | 12.1 | 434.1 | 465.4 | 48.6 |
| 23 | 22.8 g.Kymene (12.5% Solids) | 8.25 g.Methyl Cellulose (100% Solids) | 12.1 | 431.5 | 465.4 | 48.6 |
| 24 | 45.6 g.Kymeme (12.5% Solids) | 8.25 g.CMC (100% Solids) | 12.1 | 431.5 | 465.4 | 48.6 |
| 25 | 22.8 g.Kymene (12.5% Solids) | 8.25 g. CMHEC (100% Solids) | 12.1 | 431.5 | 465.4 | 48.6 |
| 26 | 2.86 g. PEI | 8.25 g.CMC | 12.1 | 431.5 | 465.4 | 48.6 |

TABLE 4-continued

| Casing Sample No. | Resin (g) | Cellulose Ether (g) | Tween 80 (g) | H$_2$O(g) | Propylene Glycol (g) | Mineral Oil (g) |
|---|---|---|---|---|---|---|
| 27 | (33% Solids) 2.86 g.Urea Formaldehyde (35% Solids) | (100% Solids) 8.25 g.CMC (100% Solids) | 12.1 | 431.5 | 465.4 | 48.6 |

CMC - Carboxymethyl cellulose
CMHEC - Carboxymethyl hydroxyethyl cellulose
PEI - Polyethyleneimine TABLE 4a

| Casing Sample No. | Cellulose Ether | Cellulose Ether Treatment Level mg/100in$^2$ | Resin | Resin Treatment Level mg/100in$^2$ | Cellulose Ether to Resin Ratio | Surface Grease Rating | Peelability % |
|---|---|---|---|---|---|---|---|
| 22 | Methyl Cellulose | 10.00 | Kymene | 1.0 | 10/1 | 3 | 96.3 |
| 23 | Methyl Cellulose | 2.90 | Kymene | 1.0 | 2.9/1 | 2 | 73.6 |
| 24 | Carboxyl Methyl Cellulose | 2.85 | Kymene | 2.0 | 1.42/1 | 4 | 98.5 |
| 25 | Carboxy Methyl Hydroxyethyl Cellulose | 2.85 | Kymene | 1.0 | 2.85/1 | 4 | 99.5 |
| 26 | Carboxy Methyl Cellulose | 2.85 | Polyethyleneimine | 0.33 | 8.64/1 | 5 | 97.6 |
| 27 | Carboxy Methyl Cellulose | 2.85 | Urea Formaldehyde | 0.35 | 8.14/1 | 3 | 98.6 |
| Untreated Sample #2 | — | — | — | — | — | 8 | 100.00 |

EXAMPLE V

In this example, casing samples No. 28 to 32 were stuffed with a typical snack food emulsion and processed under the same smokehouse processing conditions as described in the Example II. The processed stuffed casing samples No. 28 and 29 were untreated. The casing sample No. 30 was treated with carboxymethyl cellulose alone and the casing sample No. 31 was treated with Kymene alone. The casing sample No. 32 was treated with an admixture of carboxymethyl cellulose and Kymene.

The peelability and surface grease ratings of the casings in this example are shown in Table 5.

TABLE 5

| Casing Sample No. | Treatment Type | Treatment Levels (mg/100in$^2$ Casing) CMC | Kymene | Surface Grease Rating | Peelability % |
|---|---|---|---|---|---|
| 28 | Untreated Sample #1 | — | — | 6 | 89 |
| 29 | Untreated Sample #2 | — | — | 8 | 100 |
| 30 | CMC | 2.85 | — | 8 | 96 |
| 31 | Kymene | — | 1.0 | 2 | 34 |
| 32 | CMC and Kymene | 2.85 | 1.0 | 4 | 98.5 |

CMC: Carboxymethyl Cellulose

The Table 5 shows the surprising results of the invention. The casing sample no. 30 shows a typical result for the use of a release agent. Similarly, the casing sample no. 31 is a typical result for the use of a cationic thermosetting resin.

It is generally understood in the art that the mechanism for the good performance for the cationic thermosetting resin for a dry sausage is due to irreversible bonding of the resin to both the meat mass and the casing.

In view of this mechanism it is surprising that the combination of the cellulose ether and the cationic theremosetting resin provides both an acceptable surface grease rating and an acceptable peelability. It would be anticipated that the expected irreversible bonding of the resin to both the meat mass and the casing would interfere with the release required for acceptable peelability.

For the instant invention, it is believed that a new mechanism occurs. There is crosslinking between the cellulose ether and the cationic thermosetting resin so that no bonding occurs between the resin and the casing. In the dry state, the cationic thermosetting resin bonds the meat mass to the cellulose ether and the cellulose ether retains a bond to the casing. Upon wetting, the cellulose ether provides an easy release from the casing so that good peelability results.

EXAMPLE VI

This example demonstrates that the proposed mechanism appears to be correct.

Casing sample No. 33 was first slugged with methyl cellulose alone and then spray shirred with Kymene alone. Casing sample No. 34. was slugged with Kymene alone, then spray shirred with methyl cellulose alone. Casing sample No. 35 was slugged with a coating composition of the invention comprising methyl cellulose and Kymene.

The casing sample No. 33 exhibited both acceptable grease rating and peelability. Apparently, the methyl cellulose prevented the Kymene from bonding to the casing.

The casing sample No. 34 exhibited an acceptable grease rating, but the adhesion between casing, resin, and meat mass was so strong that surface marring occurred during the peeling, resulting in poor peelability. This shows that the Kymene forms an irreversible bond to the casing and the subsequent treatment with methyl cellulose cannot achieve good peelability.

The casing sample No. 35 shows the typical results of the invention for comparison.

It is of interest that the treatment of the casing sample No. 34 gave unacceptable results for snack foods.

The results are shown in Table 6.

TABLE 6

| Casing Sample No. | Treatment Type | Surface Grease Rating | Peelability % |
|---|---|---|---|
| 33 | First, Methyl Cellulose Then, Kymene | 1 | 95% |
| 34 | First, Kymene Then, Methyl Cellulose | 2 | 0 |
| 35 | Methyl Cellulose and Kymene | 2 | 96% |

ADDITIONAL EMBODIMENTS

It is known from U.S. Pat. No. 3,427,169 to Rose et al that a cellulose casing can be made to adhere to a dry sausage emulsion and follow the shrinkage of the sausage during curing through the use of a soluble protein having a molecular weight above about 10,000 and an isoelectric point in the range of from about pH 2 to pH 6. These soluble proteins include glutelins, prolamines, prolines, hydroxy prolines, histones, elastins, and protamines. Typical examples are egg albumin, edestin, glutenin, procollagen, gelatin, and gliadin.

The following are further examples of additional embodiments of the invention.

EXAMPLE VII

A cellulosic food casing as in the Example I is internally slugged with the following coating composition:
2.85 g.: gelatin
28.5 g.: methyl cellulose
442.7 g.: water Thereafter, the casing was dried prior to shirring. The following coating composition was then sprayed into the casing during shirring:
442.7 g.: water
465.5 g.: propylene glycol
12.1 g.: Tween 80
48.6 g.: mineral oil The treatment level is about 0.30 milligrams per square inch.

The casing was stuffed and processed as in the Example II.

The peelability is about 96% and the grease rating about 2.

EXAMPLE VIII

The Example VI is repeated except that 2.85 g. of egg albumin replaces the gelatin.

The peelability is about 95% and the grease rating is about 3.

EXAMPLE IX

The Example VI is repeated except that 2.85 g. of glutenin replaces the gelatin.

The peelability is about 95% and the grease rating is about 3.

We wish it to be understood that we do not desire to be limited to the exact details shown and described, for modifications will occur to a person skilled in the art.

Having thus described the invention, what we claim as new and desire to be secured by Letters Patent, is as follows:

1. A method of preparing a cellulose food casing for use with a snack food type product which comprises coating the internal surface of said food casing with a release coating composition comprising at least about 0.286% by weight of a water soluble cellulose ether and at least 0.029% by weight of cationic thermosetting resin.

2. The method of claim 1, wherein said resin is water soluble or water dispersible.

3. The method of claim 1, wherein said coating composition is an aqueous solution or suspension.

4. The method of claim 1, wherein said coating is about 3.5 milligrams per square inch of internal casing surface.

5. The method of claim 1, wherein said resin is curable from being water soluble to being water insoluble.

6. The method of claim 1, wherein said cellulose ether is selected from the group cosisting of non-ionic water soluble alkyl and hydroxyalkyl cellulose ethers, and anionic water soluble cellulose ethers.

7. The method of claim 1, wherein said cellulose ether is selected from the group consisting of methyl cellulose, hydroxypropyl methyl cellulose, hydroxypropyl cellulose, ethyl methyl cellulose, hydroxyethyl cellulose and ethyl hydroxyethyl cellulose.

8. The method of claim 1, wherein said cellulose ether is selected from the group consisting of carboxymethyl cellulose, and carboxymethyl hydroxyethyl cellulose.

9. The method of claim 1, wherein said cellulose ether is methyl cellulose.

10. The method of claim 1, wherein said resin is selected from the group consisting of reaction products of an epichlorohydrin and a polyamide, a modified melamine and formaldehyde, and a modified urea and formaldehyde.

11. The method of claim 1, wherein said resin is the reaction product of an epichlorohydrin and a polyamide.

12. The method of claim 1 wherein said coating composition is applied by slugging the casing.

13. The method of claim 1 wherein said coating composition is applied by spray shirring the casing.

14. The method of claim 1 wherein said coating composition is applied by slugging the casing with said cellulose ether and spray shirring the ether-coated casing with said resin.

15. The method of claim 1, wherein said cellulose ether is methyl cellulose and said resin is the reaction product of an epichlorohydrin and a polyamide.

16. The method of claim 15, wherein the weight ratio of said methyl cellulose to said reaction product is about 10:1.

17. The method of claim 15, wherein said coating comprises at least about 1.0 milligram of said methyl cellulose per 100 square inches of internal casing surface and at least about 0.1 milligram of said reaction product per 100 square inches of internal casing surface.

18. A method of preparing a processed food product such as a snack food type product wherein the food product is processed in a food casing, wherein the improvement comprises using a cellulosic food casing including an internal release coating comprising at least about 0.286% by weight of water soluble cellulose ether and at least 0.029% by weight of cationic thermosetting resin, and peeling said food casing from said food product subsequent to said processing.

19. The method of claim 18, wherein said resin is water soluble or water dispersible.

20. The method of claim 18, wherein said coating is an aqueous solution or suspension.

21. The method of claim 18, wherein said coating is about 3.5 milligrams per square inch of internal casing surface.

22. The method of claim 18, wherein said resin is curable from being water soluble to being water insoluble.

23. The method of claim 18, wherein said cellulose ether is selected from the group consisting of nonionic water soluble alkyl and hydroxyalkyl cellulose ethers, and anionic water soluble cellulose ethers.

24. The method of claim 18, wherein said cellulose ether is selected from the group consisting of methyl cellulose, hydroxypropyl methyl cellulose, hydroxypropyl cellulose, ethyl methyl cellulose, hydroxyethyl cellulose and ethyl hydroxyethyl cellulose.

25. The method of claim 18, wherein said cellulose ether is selected from the group consisting of carboxymethyl cellulose and carboxymethyl hydroxyethyl cellulose.

26. The method of claim 18, wherein said cellulose ether is methyl cellulose.

27. The method of claim 18, wherein said resin is selected from the group consisting of reaction products of an epichlorohydrin and a polyamide, a modified melamine and formaldehyde, and a modified urea and formaldehyde.

28. The method of claim 18, wherein said resin is the reaction product of an epichlorohydrin and a polyamide.

29. The method of claim 18, wherein the weight ratio of said methyl cellulose to said reaction product is about 10:1.

30. The method of claim 18, wherein said cellulose ether is methyl cellulose and said resin is the reaction product of an epichlorohydrin and a polyamide.

31. The method of claim 30, wherein said coating comprises at least about 1.0 milligram of said methyl cellulose per 100 square inches of internal casing surface and at least about 0.1 milligram of said reaction product per 100 square inches of internal casing surface.

* * * * *